Patented Apr. 14, 1953

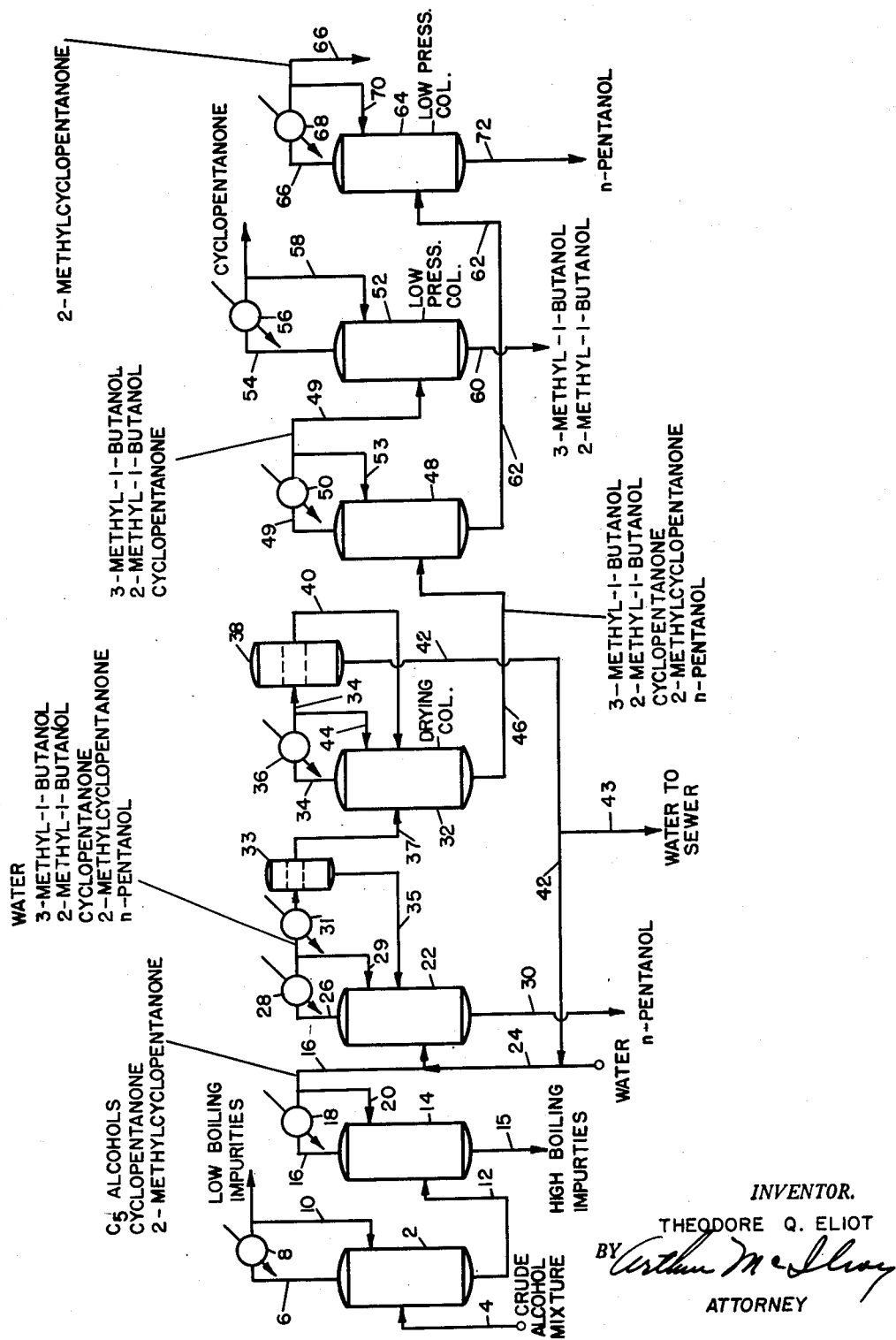

2,635,072

UNITED STATES PATENT OFFICE 2,635,072

METHOD FOR PURIFICATION OF AMYL ALCOHOLS

Theodore Q. Eliot, Tulsa, Okla., assignor to Stanolind Oil and Gas Company, Tulsa, Okla., a corporation of Delaware Application December 30, 1950, Serial No. 203,715

8 Claims. (Cl. 202—42)

1

The present invention relates to a novel method for the separation of alcohols from mixtures thereof containing ketones which either azeotrope with or which boil close to the boiling point of such alcohols. More particularly, it pertains to a method for separating various of the amyl alcohols from ketones which either azeotrope therewith such as, for example, cyclopentanone and methylcyclopentanone, or which boil so close to the boiling point of said various amyl alcohols that separation by means of straight fractional distillation is impossible.

Mixtures containing n-pentanol, 2-methyl-1-butanol and 3-methyl-1-butanol, or at least one of these alcohols together with at least one of the aforesaid ketones, cannot be satisfactorily separated by means of ordinary fractional distillation methods owing to the fact that 2-methyl-1-butanol and 3-methyl-1-butanol, which boil at 128.9° C. and 132° C. respectively, form azeotropes with cyclopentanone (B. P. 130.7° C.) boiling at approximately 127.0° C. and 129.5° C. respectively, while 2-methylcyclopentanone, which boils at 133–139° C., cannot be separated from n-pentanol boiling at 138.0° C. Although the problem of separating various of the above-mentioned amyl alcohols from cyclopentanone or 2-methylcyclopentanone occurs in numerous purification procedures, one of the principal instances where an efficient method for the separation of these compounds is most urgently needed is in their recovery, along with other chemicals, from both the water and oil fractions produced by the reduction of carbon monoxide with hydrogen in the presence of a fluidized alkali-promoted iron catalyst under known synthesis conditions. The magnitude of this problem may be more fully appreciated when it is realized that in hydrocarbon synthesis plants designed for commercial operation and having a capacity of about 6,000 bbls. per day of liquid hydrocarbons, there are produced in the water stream alone approximately 4200 lbs. of amyl alcohols per day and about 1000 lbs. per day of cyclopentanone and 2-methylcyclopentanone. Both classes of these compounds are found in the oil stream in even greater amounts than they normally occur in the aqueous fraction. Specifically, mixtures of these alcohols and ketones obtained from the water stream usually contain from about 12 to 15 per cent cyclopentanone, 6 to 10 per cent 2-methylcyclopentanone, 40 to 50 per cent n-pentanol, 7 to 10 per cent 2-methyl-1-butanol, and 8 to 11 per cent 3-methyl-1-butanol together with about 20 to 25 per cent of a high-

2 boiling residue, 40 to 50 per cent of which consists of various carbonyl fractions. Mixtures of this type can generally be separated initially into three fractions, i. e., (1) a portion consisting chiefly of 2-methyl-1-butanol, 3-methyl-1-butanol, and cyclopentanone, (2) a fraction of n-pentanol and 2-methylcyclopentanone, and (3) a fraction consisting of compounds boiling above about 137–140° C. Further distillation of the first two fractions is ineffective to separate the components thereof owing to the fact that azeotropes are formed in each instance.

Attempts have previously been made to separate the above-mentioned amyl alcohols from one another and from the aforesaid ketones by distilling the crude mixture containing these alcohols and ketones up to a temperature of about 87° C. Thereafter, a second fraction boiling from about 87° C. to about 138° C. was collected, after which the resulting distillate was azeotropically distilled with water until the overhead being obtained was substantially free of ketones. Distillation of the mixture under such conditions yielded a bottoms of n-pentanol and an overhead fraction containing 2-methyl-1-butanol and 3-methyl-1-butanol, cyclopentanone, 2-methylcyclopentanone, and a small amount of n-pentanol. This overhead fraction was distilled until all of the water had been removed, after which the resulting dry mixture of alcohols and ketones was subjected to distillation under a pressure of about 40 mm. By this operation, however, a sizeable fraction boiling from about 54° C. to about 62° C. (40 mm.) was obtained which contained the bulk of the 2-methyl-1-butanol and the 3-methyl-1-butanol together with a large portion of both ketones which passed overhead along with the alcohols. In order to effect a separation between these alcohols and ketones, the distillate collected at 54° C. to 62° C. (40 mm.) was subjected to distillation at atmospheric pressure whereby there were obtained two overhead fractions; one boiling at 130° C. and the other boiling at about 138° C. to 140° C. The bottoms fraction was relatively small and consisted essentially of high-boiling ketone polymers. The aforesaid fraction boiling at about 130° C. contained approximately 90 per cent alcohols (2-methyl-1-butanol and 3-methyl-1-butanol) but was still contaminated with about 10 per cent ketones, whereas approximately 75 per cent of the 2-methylcyclopentanone was obtained in a relatively pure condition in the fraction boiling at 138° C. to 140° C. The above procedure suffers several serious disadvantages. Because of the large number of repeated distillations, considerable mechanical losses of materials occur, and the heat-sensitive ketones are polymerized. In addition, a large amount of high-vacuum distillation equipment is necessary, since all the "iso" $C_5$ alcohols and both cyclic ketones must be distilled at about 40 mm. Finally, the separation does not completely resolve the mixture, since a final fraction is obtained at 130° C. (760 mm.) which contains appreciable amounts of both iso-alcohols and 2-methylcyclopentanone.

Accordingly, it is an object of my invention to provide a simplified and efficient method for separating the aforesaid isomeric amyl alcohols from ketones such as, for example, cyclopentanone and 2-methyl-cyclopentanone. It is still a further object of my invention to provide a method whereby said alcohols and ketones can be readily separated from one another and recovered in substantially pure form.

I have now discovered that the foregoing disadvantages in the previous methods for effecting the aforesaid separation can be avoided and that each of the desired components in the mixtures of the type mentioned above can be recovered in a state of high purity. In accordance with the process of my invention, separation of such mixtures is effected by first removing the light impurities contained therein by fractionally distilling said mixture up to a temperature of from about 118° C. to about 126° C., preferably about 121° C. Thereafter, the bottoms from this distillation operation is subjected to further fractionation up to a temperature of about 137° C. to 140° C. to bring overhead a mixture of the various amyl alcohols, cyclopentanone and 2-methylcyclopentanone, while a residue consisting of high-boiling impurities is withdrawn from the base of the still. The resulting distillate is next subjected to further fractional distillation in the presence of water. This operation is continued until the ketone content of the organic product layer being collected is not more than about 2 weight per cent, as determined by the standard hydroxylamine test or similar techniques. The bottoms fraction thus obtained consists of essentially pure n-pentanol, while the distillate consists of 2-methylcyclopentanone, cyclopentanone, 2-methyl-1-butanol, 3-methyl-1-butanol, and water together with a small amount of n-pentanol. The latter mixture is then dried in accordance with any suitable procedure. For example, I generally prefer to accomplish this object by distilling the water off in the form of a constant boiling mixture with the various alcohols and ketones. These alcohols and ketones, which are substantially insoluble in water, form an upper layer in the resulting distillate that is drawn off and recycled to the distillation column. Ultimately, an anhydrous mixture is obtained consisting of 2-methylcyclopentanone, cyclopentanone, 2-methyl-1-butanol and 3-methyl-1-butanol, together with a small quantity of n-pentanol which was carried over in the previous distillation step to insure the procurement of a bottoms of substantially pure n-pentanol. After this mixture has been thoroughly dried, it is next fractionally distilled to obtain overhead an azeotrope-containing mixture of cyclopentanone, 2-methyl-1-butanol and 3-methyl-1-butanol boiling in the range of 127° C. to 132–134° C. The bottoms fraction thus obtained consists largely of 2-methylcyclopentanone, the balance being n-pentanol. Thereafter, both the overhead and bottoms fractions are separately distilled under reduced pressure to effect a separation of the remaining components of each mixture. Thus, in the case of the distillate or overhead fraction, cyclopentanone is separated from 2-methyl-1-butanol and 3-methyl-1-butanol by fractionation of the mixture at a pressure of from about 40 to 200 mm., while the mixture consisting of 2-methylcyclopentanone and n-pentanol is subjected to distillation at pressures of from about 40 to 150 mm. In both instances, distillation is generally preferably effected at pressures in the neighborhood of 100 mm.

To summarize, a preferred embodiment of my invention comprises the following steps:

(1) Distillation of the crude mixture of alcohols and ketones up to about 121° C. to remove light impurities.

(2) Further fractionation of the residue from step (1) and collecting distillate boiling up to about 138° C.

(3) Subjecting the distillate obtained in step (2) to distillation in the presence of water and continuing distillation until the ketone content of the organic product layer being collected is less than about 2 weight per cent, giving a bottoms fraction consisting of n-pentanol.

(4) The overhead fraction from step (3), which consists of cyclopentanone, 2-methylcyclopentanone, 2-methyl-1-butanol, 3-methyl-1-butanol, some n-pentanol and water, is dried.

(5) The dry mixture obtained in step (4) is fractionally distilled up to about 132–134° C.

(6) The distillate obtained in step (5) is fractionally distilled under pressure of about 100 mm. to yield an overhead of substantially pure cyclopentanone and a bottoms of the two branched-chain amyl alcohols.

(7) The bottoms produced in step (5) is likewise distilled at about 100 mm. to yield pure 2-methylcyclopentanone overhead leaving a bottoms fraction of n-pentanol.

For a better understanding of the process of my invention an example is given below illustrating the principles thereof as applied to a higher alcohols fraction obtained from a plant processing water-soluble chemicals produced in hydrocarbon synthesis.

Example

A crude aqueous mixture of higher alcohols having the following composition was selected to be refined in accordance with the invention described above:

| Component: | Weight per cent (dry basis) |
|---|---|
| n-Butanol | 5 |
| 2-methyl-1-butanol | 8 |
| 3-methyl-1-butanol | 6 |
| Cyclopentanone | 11 |
| 2-methylcyclopentanone | 7 |
| n-Pentanol | 40 |
| Fraction boiling above 140° C. (760 mm.) | 23 |
| | 100 |

The above mixture was next distilled and fractions selected at 126° C. and at 137.5° C. The fraction boiling up to 126° C. contained principally n-butanol and water and amounted to 6.5 weight per cent of the mixture distilled. The fraction boiling between 126° C. and 137.5° C. consisted essentially of the $C_5$ alcohols, both normal and branched-chain, cyclopentanone and 2- methylcyclopentanone. This fraction was composed of 16.3 weight per cent branched-chain amyl alcohols, 13 weight per cent cyclopentanone, 61.4 weight per cent n-pentanol and 9.3 weight per cent 2-methylcyclopentanone. The mixture collected between 126° C. and 137.5° C. was next distilled in the presence of water until the ketone content of the organic product layer being collected is less than 2 weight per cent. The distillate from this operation had the following composition (dry basis):

35.5 weight per cent branched-chain amyl alcohols, 28.2 weight cyclopentanone, 16.4 weight per cent n-pentanol and 19.9 weight per cent 2-methylcyclopentanone, while the bottoms (dry basis) consisted of 99.5 weight per cent n-pentanol and 0.5 weight per cent 2-methylcyclopentanone.

The above overhead or distillate portion was next distilled to remove the water contained therein in the form of constant boiling mixtures with the C₅ alcohols and the C₅ and C₆ ketones, after which cuts were taken, during distillation, of the resulting dry mixture at 124° C. to 134° C. and at 134° C. to 138° C. The first fraction consisted of 52 weight per cent branched-chain amyl alcohols, 41.5 weight per cent cyclopentanone and 6.5 weight per cent 2-methylcyclopentanone, while the 134° C. to 138° C. cut contained 49 weight per cent 2-methylcyclopentanone and 51 weight per cent n-pentanol. These fractions were next separately distilled at 40 mm. The fraction previously collected up to 134° C. yielded an overhead boiling at 49° C. and consisted of cyclopentanone which was 96.5 per cent pure. From 49° C. to 55° C., a fraction was obtained which analyzed 66 per cent cyclopentanone, and at 61° C. to 63° C. an overhead was collected analyzing 99.6 per cent 2-methyl-1-butanol and 3-methyl-1-butanol. The portion boiling above 63° C. (40 mm.) consisted chiefly of a high-boiling ketone fraction, probably at least partially polymerized due to continued heating. The fraction previously collected up to 138° C., i. e., from 134° C. to 138° C., was distilled at 40 mm. to yield (as bottoms) 69 per cent of the n-pentanol in the charge as pure ketone-free material. About 64 per cent of the 2-methylcyclopentanone was recovered in the distillate, its purity being 89 per cent.

The process of my invention is further illustrated by the accompanying flow diagram in which a crude mixture of amyl alcohols derived from the separation of n-butanol and lighter alcohols present in the hydrocarbon synthesis product water stream is introduced at an intermediate point in column 2 through line 4. Within column 2, which is operated so as to remove light impurities boiling up to about 121° C., light impurities are withdrawn through line 6 and condenser 8, while a portion of this stream is returned to the column through line 10 as reflux. After low-boiling impurities have been removed in this manner, the residue thus obtained is withdrawn from column 2 through line 12 and passes into column 14 where a fraction boiling up to about 138° C. is taken overhead through line 16 and condenser 18. Part of the stream thus removed from column 14 is returned thereto via line 20 while the remainder passes into column 22. Withdrawal of high-boiling impurities from column 14 is effected through line 15. The stream introduced into column 22 consists essentially of C₅ alcohols, both normal and branched-chain, cyclopentanone and 2-methylcyclopentanone. Prior to introduction of the aforesaid stream into column 22, it is mixed with water added through line 24. Water is added at this point to permit all of the components of the stream withdrawn from column 14, with the exception of n-pentanol, to pass overhead through line 26 and condenser 28 in the form of their water azeotropes. This distillation is operated under conditions such that both ketones, the branched-chain alcohols and a small amount of n-pentanol are removed in the distillate. The bottoms fraction thus obtained in column 22 is substantially free from ketones or, at most, contains not more than about 0.5 weight per cent. During distillation, part of the stream withdrawn through line 26 is returned as reflux to column 22 via line 29. Wet n-pentanol, free from ketones and branched-chain alcohols, is withdrawn from the bottom of column 22 through line 30. The stream coming from condenser 28 is sent to cooler 31, after which it flows into separator 33 where it settles out into two layers, the lower water layer being recycled to column 22 through line 35. The organic product layer is withdrawn through line 37 and introduced into drying column 32 where removal of the water therefrom is effected by withdrawing aqueous azetropes of the alcohols and ketones contained therein through line 34 and condenser 36, after which these azeotropes are introduced into separator 38 where they are allowed to stratify into two layers. The upper layer, or organic phase, is withdrawn through line 40 and is returned to column 32 while the lower water layer is removed from separator 38 via line 42 and recycled to the system through line 24. Excessive build-up of water-soluble impurities in this water layer may be prevented by periodically withdrawing a stream through line 43. A portion of the stream withdrawn through line 34 is returned to column 32 as reflux through line 44. The dry bottoms in column 32 which consists of 2-methyl-1-butanol, 3-methyl-1-butanol, n-pentanol, cyclopentanone and 2-methylcyclopentanone is withdrawn through line 46 and passed into column 48 which is operated at 132° C. to 134° C. (vapor temperature). Within this column, a vaporous mixture of 2-methyl-1-butanol, 3-methyl-1-butanol and cyclopentanone is brought overhead through line 49 and condenser 50 and introduced to low pressure column 52. Part of the stream withdrawn through line 49 is returned to column 48 as reflux via line 53. In low-pressure column 52, which is operated at about 100 mm., cyclopentanone is brought overhead through line 54 and condenser 56 at a temperature of about 71° C., a portion of this stream being returned to the column as reflux through line 58. The bottoms fraction obtained by this operation is withdrawn through line 60 and consists of substantially pure 2-methyl-1-butanol and 3-methyl-1-butanol. The bottoms fraction in column 48 is removed therefrom through line 62 and introduced into low-pressure column 64 where separation between 2-methylcyclopentanone and n-pentanol is effected. This low-pressure column is likewise operated at about 100 mm., 2-methylcyclopentanone being removed overhead through line 66 and condenser 68 at a temperature of about 80° C. Reflux to the colume of a portion of the stream withdrawn via line 66 is maintained by returning a small stream through line 70. Ketone-free n-pentanol is withdrawn from the column through line 72. While the foregoing example and flow diagram illustrate advantageous embodiments of my invention, it is to be understood that the scope thereof is not limited thereto. On the contrary, my invention is to be construed broadly with respect to the present description and claims; and, in general, it is to be understood that any modifications of equivalents which would normally occur to those skilled in the art are to be considered as lying within the scope of my invention.

Throughout the present description and claims, all boiling points referred to are the boiling points of the compounds in question at atmospheric pressures, unless otherwise indicated. Also, the expression "close-boiling ketones" as used herein is intended to include both ketones which azeotrope with the alcohol or alcohols concerned or which actually boil so close thereto that separation of the alcohol or alcohols therefrom cannot be effected by ordinary distillation techniques. In azeotroping operations involving distillation in the presence of water, it is assumed that the resulting bottoms may be wet, depending on whether or not the operation is carried out batchwise or continuously and depending upon the amount of water added during distillation.

What I claim is:

1. In a process for the recovery of 2-methyl-1-butanol and 3-methyl-1-butanol from mixtures containing n-pentanol and ketones wherein some of said ketones azeotrope with n-pentanol and some azeotrope with 2-methyl-1-butanol and 3-methyl-1-butanol, said mixture having a boiling range from about 121° C. to about 139° C.; the steps which comprise subjecting said mixture to distillation in the presence of at least sufficient water to form azeotropes with all of said 2-methyl-1-butanol, 3-methyl-1-butanol and said ketones; continuing this distillation until the ketone content of the organic product layer being collected is not more than about 2 weight per cent, drying the overhead fraction obtained in said last-mentioned distillation step, thereafter subjecting the resulting dry mixture to fractional distillation, collecting a distillate up to about 132–134° C., and subjecting this distillate to further fractionation at a pressure of from about 40 to about 200 mm. to obtain overhead substantially pure cyclopentanone, leaving a bottoms fraction consisting of substantially pure 2-methyl-1-butanol and 3-methyl-1-butanol.

2. In a process for the recovery of n-pentanol, 2-methyl-1-butanol and 3-methyl-1-butanol from dry mixtures thereof containing ketones wherein some of said ketones azeotrope with n-pentanol and some azeotrope with 2-methyl-1-butanol and 3-methyl-1-butanol, the steps which comprise subjecting said mixture to distillation and collecting a fraction boiling from about 121° C. up to about 132–134° C., thereafter further fractionating said distillate at a pressure of from about 40 to about 200 mm. to obtain a bottoms fraction of substantially pure 2-methyl-1-butanol and 3-methyl-1-butanol, subjecting that portion of the aforesaid mixture boiling above 134° C. to further fractional distillation at a pressure of from about 40 to about 150 mm., continuing this distillation until the ketone content of the organic product layer being collected is less than about 2 weight per cent, and recovering a bottoms of substantially pure n-pentanol.

3. In a process for the recovery of n-pentanol from mixtures containing 2-methyl-1-butanol, 3-methyl-1-butanol and ketones wherein some of said ketones azeotrope with n-pentanol and some azeotrope with 2-methyl-1-butanol and 3-methyl-1-butanol, the steps which comprise subjecting said mixture to distillation, collecting a fraction boiling from about 121° C. to about 139° C., consisting essentially of n-pentanol, 2-methyl-1-butanol, 3-methyl-1-butanol and said ketones, thereafter subjecting the fraction thus collected to distillation in the presence of at least sufficient water to form azeotropes with all of said 2-methyl-1-butanol, 3-methyl-1-butanol and said ketones, and continuing the distillation until the ketone content of the organic product layer being collected is not more than about 2 weight per cent to thereby obtain a bottoms fraction consisting essentially of n-pentanol free from said ketones, 2-methyl-1-butanol and 3-methyl-1-butanol.

4. In a process for the recovery of n-pentanol, 2-methyl-1-butanol and 3-methyl-1-butanol from mixtures containing ketones wherein some of said ketones azeotrope with n-pentanol and some azeotrope with 2-methyl-1-butanol and 3-methyl-1-butanol, the steps which comprise subjecting said mixture to distillation, isolating a fraction boiling from about 121° C. to about 139° C., subjecting the resulting fraction to further distillation in the presence of at least sufficient water to azeotrope with said 2-methyl-1-butanol, 3-methyl-1-butanol and said ketones, continuing said distillation until the ketone content of the organic product layer being collected is not more than about 2 weight per cent to thereby obtain a bottoms fraction consisting of substantially pure n-pentanol, drying the overhead fraction obtained in said last-mentioned distillation step, thereafter subjecting the resulting dry mixture to fractional distillation and collecting a distillate up to about 132–134° C., subjecting this distillate to further fractionation at a pressure of about 40 to about 200 mm. to obtain a bottoms fraction consisting of substantially pure 2-methyl-1-butanol and 3-methyl-1-butanol.

5. The process of claim 4 in which the mixture being distilled contains from about 12 to 15 per cent cyclopentanone, 6 to 10 per cent 2-methylcyclopentanone, 40 to 50 per cent n-pentanol, 7 to 10 cent 2-methyl-1-butanol, and 8 to 11 per cent 3-methyl-1-butanol.

6. In a process for the recovery of 2-methyl-1-butanol and 3-methyl-1-butanol from mixtures containing n-pentanol and ketones wherein some of said ketones azeotrope with n-pentanol and some azeotrope with 2-methyl-1-butanol and 3-methyl-1-butanol, said mixture having a boiling range of from about 121° C. to about 139° C., the steps which comprise subjecting said mixture to distillation in the presence of at least sufficient water to form azeotropes with all of said 2-methyl-1-butanol, 3-methyl-1-butanol and said ketones, continuing this distillation until the ketone content of the organic product layer being collected is not more than about 2 weight per cent, drying the overhead fraction obtained in said last-mentioned distillation step, thereafter subjecting the resulting dry mixture to fractional distillation, collecting a distillate up to about 132–134° C., and subjecting this distillate to further fractionation at a pressure of from about 40 to about 200 mm. to obtain overhead substantially pure cyclopentanone, leaving a bottoms fraction consisting of substantially pure 2-methyl-1-butanol and 3-methyl-1-butanol.

7. In a continuous process for the recovery of n-pentanol from a mixture boiling from about 121° C. to about 139° C. and containing 2-methyl-1-butanol, 3-methyl-1-butanol and ketones wherein some of said ketones azeotrope with n-pentanol and some azeotrope with 2-methyl-1-butanol and 3-methyl-1-butanol, the steps which comprise subjecting said mixture to distillation in the presence of at least sufficient water to form azeotropes with all of said 2-methyl-1-butanol, 3-methyl-1-butanol and said ketones, withdrawing a bottoms fraction of n-pentanol substantially free from 2-methyl-1-butanol and 3-methyl-1-butanol and containing not more than about 0.5 weight per cent ketones, and repeating the above cycle.

8. The process of claim 1 in which the pressure employed in the low pressure distillation step is approximately 100 mm.

THEODORE Q. ELIOT.

References Cited in the file of this patent

UNITED STATES PATENTS

| Number | Name | Date |
|---|---|---|
| 2,324,255 | Britton et al. | July 13, 1943 |
| 2,551,584 | Carlson et al. | May 8, 1951 |
| 2,551,593 | Gilliland et al. | May 8, 1951 |
| 2,551,624 | Morrell et al. | May 8, 1951 |
| 2,552,911 | Steitz | May 15, 1951 |
| 2,564,200 | Grehel | Aug. 14, 1951 |